United States Patent [19]

Kusama et al.

[11] 3,783,187

[45] Jan. 1, 1974

[54] FACSIMILE TRANSMISSION SYSTEM

[75] Inventors: Takeo Kusama; Takashi Hyodo, both of Yokohama, Japan

[73] Assignee: Hitachi, Ltd., Tokyo, Japan

[22] Filed: May 5, 1972

[21] Appl. No.: 250,723

Related U.S. Application Data

[63] Continuation-in-part of Ser. No. 7,966, Feb. 2, 1970, abandoned.

[52] U.S. Cl. ................................ 178/6, 178/DIG. 3

[51] Int. Cl. ............................................ H04n 7/12

[58] Field of Search ..................... 178/6, 6.8, DIG. 3

[56] References Cited

UNITED STATES PATENTS

| | | | |
|---|---|---|---|
| 3,588,329 | 6/1971 | Monk | 178/6 |
| 3,324,237 | 6/1967 | Cherry et al. | 178/DIG. 3 |
| 2,922,840 | 1/1960 | Lally | 178/DIG. 3 |

*Primary Examiner*—Robert L. Griffin
*Assistant Examiner*—Joseph A. Orsino, Jr.
*Attorney*—Paul M. Craig, Jr. et al.

[57] ABSTRACT

A facisimile transmission system wherein each of white or black run lengths of an original picture is coded into a binary form, whose bit number is required to represent the maximum run length of said original picture, and each of the codes constituted by said number of bits is divided into blocks, each thereof containing a predetermined number of bits, and a bit for discriminating whether the code represents a white or black run length is added to the block containing a first "1" bit starting from the highest order block and is also added to the succeeding block or blocks, thereby eliminating the block or blocks, which precede said block containing the first "1" bit and contain only "0" bits to constitute only insignificant portions, so as to reduce the number of bits of the codes to be transmitted and to thereby compress a bandwidth of a facsimile signal. Typically, the number of bits of a run length is less than ten, but not necessarily.

16 Claims, 7 Drawing Figures

FIG. 2
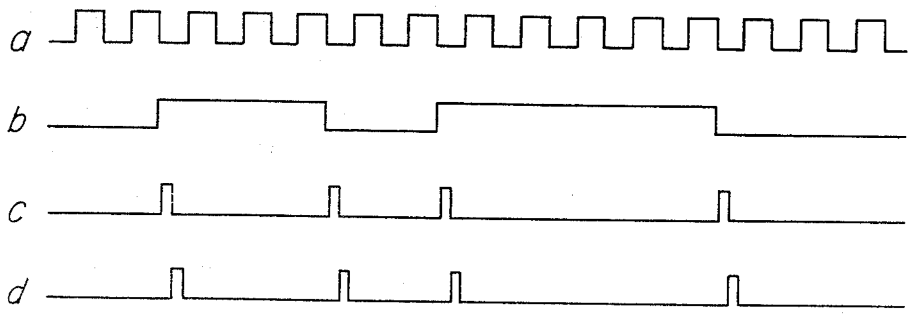
FIG. 3
| ORDER | "1" OR "0" | R. L. | ORIGINAL CODE | | CODE AFTER CONVERSION |
|---|---|---|---|---|---|
| | | | BLOCK 1 | BLOCK 2 | |
| 1 | 1 | 2 | 0 0 | 1 0 | 1 0 0 |
| 2 | 0 | 13 | 1 1 | 0 1 | 1 1 1 0 1 1 |
FIG. 4
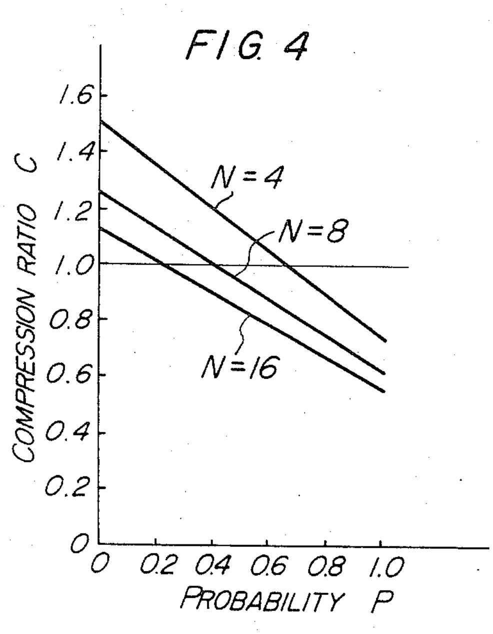

FACSIMILE TRANSMISSION SYSTEM

CROSS-REFERENCES TO RELATED APPLICATIONS

This application is a continuation-in-part of application Ser. No. 7966, filed on Feb. 2, 1970, now abandoned.

BACKGROUND OF THE INVENTION

1. Field of the Invention

The present invention relates to a facsimile transmission system, and more particularly to a method of compressing the bandwidth in facsimile transmission.

In the usual facsimile telegraphy, two alternate picture signal parts corresponding to the black and white portions of the original picture are repeatedly transmitted. These picture signals contain components at frequencies from d.c. to the highest picture frequency determined by the scanning density and the scanning speed.

For an exact picture reproduction on the receiving side all the picture signal components over a predetermined frequency band should be faithfully passed.

The picture signal transmission, however, is usually made through transmission systems which have already been established. Therefore, restriction is imposed upon the frequency band for the picture signals to meet the specifications of the transmission system employed.

To be relieved from such restrictions, there have been proposed various methods for compressing the frequency band by coding the picture signal, for instance by reducing the redundancy of the picture signal parts corresponding to the black and white elements of the picture.

2. Description of the Prior Art

The usual facsimile apparatus adopts a system of scanning the original picture at a constant speed to resolve it into numerous picture elements of a constant size and coding these elements into a binary signal corresponding to the black and white states thereof for the facsimile transmission. Accordingly, the time required for the transmission of a picture does not depend upon the quantity of information contained in it, but rather depends upon the size when the scanning speed, scanning line density and bandwidth of the transmission system are constant. Therefore, for the transmission of the signal for a picture having a relatively large marginal or blank space such as simple documents, it is possible to largely reduce the time necessary for the transmission by coding the signal in such a manner that the redundancy is reduced. Of the coding method of the foregoing kind, the following two methods are known.

In one method, the length of a signal portion corresponding wholly to black or alternately white picture elements (termed run length and hereinafter abbreviated to R. L.) is coded into a predetermined code length. When the effective picture length in the main scanning direction is L millimeters and the scanning line density is $l$ elements per millimeter, the largest possible R. L. is L times $l$ and the required code length is $\log_2 L \cdot l$ By way of example, with L equal to 125 and $l$ equal to 4, the R. L. is $L \times l = 500$, which requires 9 bits as the code length. For ordinary pictures the R. L. for the black element is extremely short, of the order of 2 to 3 on an average and mostly below 10, while the average R. L. for the white element is somewhere between 10 and 100. Therefore, when the code length is 9 bits as in the above example, the redundancy is still considerably high, so that sufficient compression effect cannot be expected.

The other method has resorted to the probability of occurrence of various values of the R. L., and the code length is made variable by associating a shorter code with the R. L. of higher probability of occurrence, and a longer code with the R. L. of lower probability of occurrence. This method can use various coding methods depending upon the ways of associating the R. L. with the corresponding code, all of which are said to be efficient. However, the probability of the occurrence of the R. L. is different depending on the kinds of the pictures to be transmitted, so that the efficiency of coding is also different. Also, since the code length is variable, the construction of apparatus such as coding and decoding circuitry is disadvantageously complicated.

SUMMARY OF THE INVENTION

An object of the present invention is to remove the above-mentioned disadvantage. The present invention provides a method of compressing a bandwidth in facsimile transmission systems, wherein by making use of a tendency such that a facsimile signal, which is transmitted after being converted into a binary-coded signal, composed of 1 and 0 bits has shorted run lengths, the run length of a white or black signal being coded with bits the number of which is necessary to represent a signal having a maximum run length, and thereafter the binary-coded facsimile signal is divided into blocks, each of which contains an equal number of bits and also has an additional bit added thereto for identifying a white or black signal. All of the blocks preceding a block which contains a first 1 bit are eliminated, namely, all of the blocks containing 0 bits alone, thereby reducing the necessary length of the binary-coded facsimile signal and compressing the transmission bandwidth.

According to the invention coding conversion with a sufficient compression ratio and reverse conversion may be readily made by an extremely simple converting circuit.

The invention also brings a great advantage that the coded output after the coding conversion takes the form of a kind of a self-synchronized code capable of word synchronization without the addition of a synchronizing bit. Also, in compressing the bandwidth of the facsimile signal by coding it and temporarily storing the coded signal, a memory apparatus of a low capacity is used thereby reducing the cost of the memory apparatus, because the quantity of information stored in the memory apparatus is inspected at all times, whereby when there is no information in the memory apparatus, codes (i.e. dummy codes) that are different from those carrying information are sent, so that the rate of information transmission may be increased to the maximum allowable rate, determined by the characteristics of the transmission line to reduce the required capacity of the memory apparatus, because the memory apparatus only has to store information at those times when the rate of generation of coded information exceeds the rate of information transmission. Once the rate of information generation falls below the maximum rate of information transmission, then the difference is made up from the information in the memory apparatus. Besides, once the memory apparatus is empty, then dummy codes are sent to maintain the rate of transmission.

BRIEF DESCRIPTION OF THE DRAWING

FIG. 2 shows waveforms to illustrate the operation of various parts of the code conversion circuit of FIG. 1.

FIG. 3 is a chart giving examples of code conversion according to the invention.

FIG. 4 is a graph showing the relationship between the compression ratio of the code length and the probability of occurrence of the signal length.

DESCRIPTION OF THE PREFERRED EMBODIMENT

The method of conversion used in the system made in accordance with the invention is such that a binary code of a run length is divided into blocks of equal length, a bit to distinguish whether the code relates to the black and white picture elements is added to that block, in which digit 1 first appears beginning from the most significant block, and added to each of the following blocks, and only those blocks which have the additional bit are transmitted, thereby decreasing the total number of bits required. The code converted in the above manner may be readily decoded on the receiving side, because the number of the blocks, i.e., the code length, may be detected by virtue of the additional bits distinguishing between the black and white picture elements.

The invention will now be described with reference to an exemplary case where the maximum value 15 of the signal length, R. L., which corresponds to the maximum code length of 4 bits, is divided into two blocks each having two bits.

Figure 1:
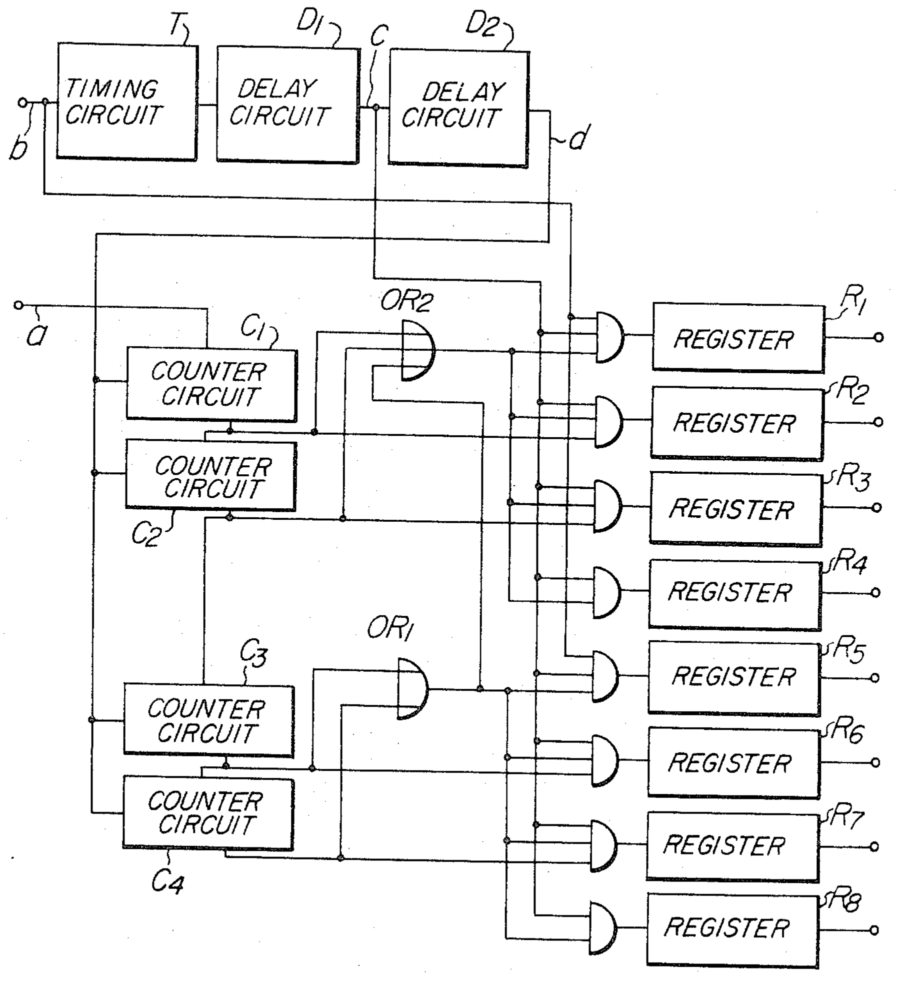
FIG. 1 is a block diagram of a code conversion circuit for explaining the invention.

FIG. 1 illustrates a code conversion circuit embodying the invention, which comprises a timing circuit T generating timing pulses at the rise and fall times of an input signal, delay circuits $D_1$ and $D_2$, four binary counters $C_1$ to $C_4$, and resisters $R_1$ to $R_8$. In operation, as shown in FIG. 2, an input signal (shown at b) synchronized with a train of clock pulses (shown at a) is differentiated at its rise and fall portions by the timing circuit T and delayed by the delay circuit $D_1$ to provide read-out pulses (shown at *c*), which are in turn delayed by the delay circuit $D_2$ to provide reset pulses (shown at *d*). When the input signal is changed from 0 to 1 or conversely from 1 to 0, the contents of the counters $C_1$ to $C_4$ which have been counting clock pulses (*a*) are read-out by the read-out pulses (*c*) and reset by the reset pulses (*d*), whereupon the counting of the clock pulses (*a*) are started again. Thus, the counter counts the interval or length between adjacent two changes of the input signal, i.e., R. L., so that outputs from the counters $C_1$ to $C_4$ provide binary coded signal lengths R. L. at the appearance of the read-out pulses (*c*).

The binary coded signal length R. L. is then subjected to the following code conversion. Referring to FIG. 1 again, the counters $C_1$ to $C_4$ are divided into two blocks, namely the first block (block 1) consisting of the counters $C_4$ and $C_3$ and the second block (block 2) consisting of the counters $C_2$ and $C_1$ from the most significant binary digit. OR circuits $OR_1$ and $OR_2$ are provided for the blocks, respectively. Writing in the resisters $R_1$ and $R_8$ is controlled by the outputs of the OR circuits $OR_1$ and $OR_2$. When all the outputs from the counters $C_4$ and $C_3$ of block 1 are 0 at the instance of occurrence of the read-out pulse, the output from the logic circuit $OR_1$ is 0 to prohibit an input to the register $R_5$ to $R_8$. In this case, 0 is stored in the register $R_8$ to indicate that block 1 is invalid or not useful. When at least one bit of the counters $C_4$ and $C_3$ is 1, the output of the $OR_1$ is 1, permitting the transfer of the contents of the counters $C_4$ and $C_3$ to the registers $R_7$ and $R_6$, respectively, and at the same time registering 1 in the register $R_8$ via an associated validity AND gate to indicate that block 1 is valid or useful. Also, a digit indicating whether the R. L. is for a 1 or 0 is stored in the register $R_5$.

Similarly, information concerning block 2 is stored in the registers $R_4$ and $R_1$ belonging to block 2. As the output of the logic circuit $OR_1$ is impressed upon the logic circuit $OR_2$, 1 is stored in the register $R_4$ and block 2 becomes valid, even if the outputs of the counters $C_1$ and $C_2$ are all 0 inasmuch as the output of the logic circuit $OR_1$ is 1.

The read-out of the registers $R_5$ to $R_7$ and $R_1$ to $R_3$ is controlled at each block by the contents of the registers $R_8$ and $R_4$ indicating whether the respective blocks are valid or invalid. Thus, when the content of the register $R_8$ is 1, block 1 is valid and the code length after the conversion takes 6 bits, whereas when the content of the register $R_8$ is 0, block 1 becomes invalid, taking no part in the reading-out, and the converted code consists of only block 2, thus reducing the code length to 3 bits. Examples of code conversion by the code converting circuit of FIG. 1 are shown in FIG. 3. In FIG. 3, the order 1 represents the case where a signal 1 (for example a black signal) having a run length of 2 is subjected to code conversion. The signal having a run length of 2 is coded with an ordinary binary code of four bits to obtain 0010. This binary coded signal is then divided into two blocks 00 and 10, each block comprising two bits. All of the bits of the first block are 0 and a bit 1 appears in the second block for the first time. Subsequently, in the code after conversion, the first block is eliminated and one bit ⓪ for representing that the present signal is 1 is added to the two bits 10 in the second block changing it to a three bit number 100 which represents that the present signal is 1.

In the order 2 of FIG. 3, a signal 0 (for example, a white signal) having a run length of 13 is coded with an ordinary binary code of four bits to obtain the binary representation of 13, i.e., 1101. In a manner similar to the above described order of 1, the binary-coded signal 13 is divided into two blocks 11 and 01 each block comprising two bits. Since both of the first and second blocks contain a bit 1, a bit ① for representing that the present signal is 0 is added to each of the blocks to change them to 3 bit numbers, i.e., 111 and 011, thereby obtaining a code after conversion of six bits 111011.

Thus, as can be seen from the foregoing, a signal having a run length within the range of 1 to 3 is given a code length of 3 bits, while a signal having a run length within the range of 4 to 15 is given a code length of 6 bits.

The foregoing description is concerned about the code conversion. The inverse conversion may be readily realized by monitoring the additional bits of the individual blocks indicating the 1 or 0 of the input signal to discriminate the code length. It is also possible to achieve the word synchronization by utilizing the fact that the additional bit of each of the blocks in the preceding example comes up periodically, and the number of times either 0 or 1 takes place in succession is 2 at most. In this respect, the symbol having underwent the above coding conversion can be regarded as a kind of self-synchronized symbol. The mean code length when the symbols coded in terms of N-bit binary numbers (N is an even integer) are subject to the above coding conversion is now discussed. For the sake of brevity, the case is taken of dividing an N-bit number into two parts each having N/2 bits and converting coded signals with R. L. of less than $2^{N/2}-1$ into the corresponding numbers of (N/2 + 1) bits and coded signals with R. L. of more than $2^{N/2}$ into the corresponding numbers of 2(N/2 + 1) bits. Denoting the probability that the R. L. is less than $2^{N/2}-1$ by P, the mean code length L is given as $$L = (N/2 + 1)\,P + 2(N/2 + 1)(1 - P) = (N/2 + 1)(2 - P).$$

The compression ratio C of L to the length N of the original binary number is thus $$C = L/N = (1/2 + 1/N)(2 - P).$$

FIG. 4 shows the compression ratio of the code length against the probability that the R. L. is less than $2^{N/2}-1$ for N of 4, 8 and 16. As is seen, the compression ration C is decreased with increasing P and N, and can take a minimum value of about 0.56 for N of 16. It is thus possible, when smaller values of the R. L. are concentrated as in the facsimile signals, to achieve much more efficient coding as compared to the mere binary symbol coding by the above coding conversion.

Though in the above code conversion in a binary number is divided into two blocks, it may also be divided into three or more blocks, so that the most efficient code conversion may be adopted according to the distribution of the R. L. Further, in case of a binary code incapable of being divided into blocks of an equal length, a suitable length of dummy bits (0) may be added to the binary number in front thereof to make the binary number have a divisible number of bits prior to the code conversion. In this case, the reverse conversion on the receiving side may be simplified by so arranging as to ignore the dummy bits.

As the rate of generation of the coded information changes with time, the coded information is temporarily stored in a memory before it is transmitted. It is also temporarily stored after reception on the receiving side prior to conversion into black and white signals through a decoder.

Figure 5:
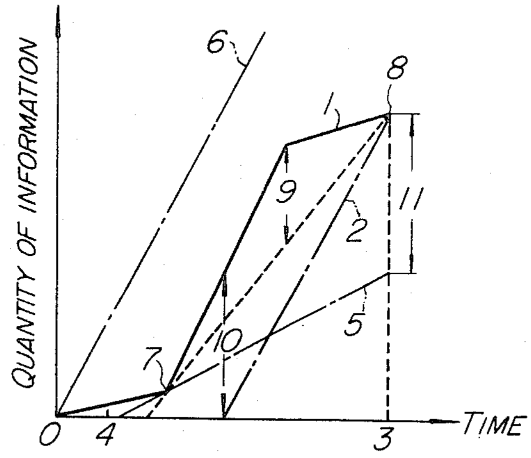
FIGS. 5 and 6 are graphs illustrating the relationship between the quantity of output information and the rate of information transmitted.

The relation between the memory capacity of the memory apparatus and the rate of transmission of the scanned information output is now described with reference to FIG. 5.

Generally, the original is blank in the marginal portion and contains much information such as letters and drawings in the central portion. By taking the instant, at which the facsimile apparatus on the transmitting side starts a scan operation (plot 6) at the origin of the co-ordinate axes in FIG. 5, the rate of generation of the coded information output (plot 1) is low near starting point 4 and the end of line 5 of the scanning operation and high at points intermediate therebetween.

Thus, the slope is gradual for the initial and final portions and steep for the intermediate portion. In contrast to the rate of generation of coded information output as shown by plot 1, the rate of coded information transmission must be linear as indicated any of lines 2, 5 and 6, as the coded information is transmitted at the maximum rate determined by the characteristics of the transmission line. The minimum capacity of the memory apparatus for the coded information output as shown by plot 1 is the quantity of coded information needed to be stored as indicated at 9 when the coded information can only be transmitted at a lower rate represented by a line connecting points 7 and 8.

When the rate of generation of the coded information is lower than the rate of transmission of the coded information, as is seen from line 6 for the rate of transmission and plot 1 for the rate of generation, the memory apparatus gets no information to send forth if transmission in started simultaneously with the scanning, so that it is impossible for the transmission to be continuous at least for a certain period of time. Accordingly, the transmission is started shown by line 2 at an instant somewhat later than the instant of starting of the scanning. The memory capacity required for the memory apparatus at this starting time is indicated at 10.

When the rate of the coded information transmission is generally lower than the rate of coded information generation, the memory capacity may be minimized if transmission is made as indicated by line 5. In this case, the required capacity of the memory apparatus is indicated at 11. In this system, the required capacity is generally high. By way of example, with a transmission rate of 3 kilobits per second, a rate of coded information generation of 10 kilobits per second and a scanning period of 30 seconds, a relatively large memory apparatus having a capacity of about 20 kilobits is required, so that the bandwidth compression by the prior art code conversion is economically impracticable.

According to a further feature of the invention, the foregoing economic drawback of having a large memory is overcome by varying the rate of transmission of the output information so as to closely match the rate of generation of the output coded information, thereby reducing the capacity of the memory apparatus.

Figure 6:
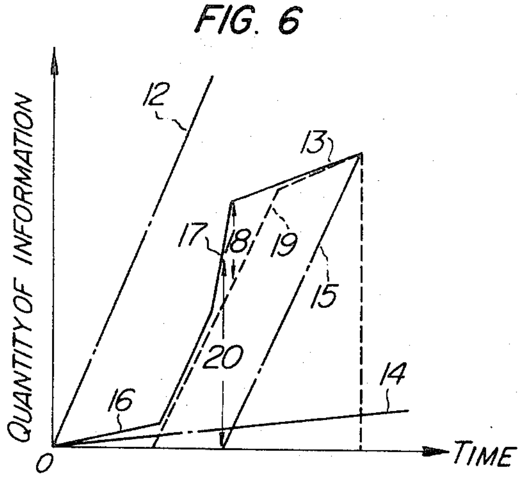

This further feature of the invention will now be described with reference to FIG. 6, which also compares the rate of coded information output generation and the rate of coded information transmission. Plot 12 indicates a transmission rate higher than the rate of generation of the coded information output 13, and plot 14 indicates a lower transmission rate. In accordance with the principles discussed in connection with FIG. 5, the start of the coded information transmission is delayed until after the start of the scanning when the transmission rate 12 is higher than an output generation rate 13 as shown in FIG. 6. In a different aspect of the invention, the memory apparatus is inspected at all time, and coded signals (hereinafter termed dummy codes), which are never sent forth as the information signals, are generated, when there is no information stored in the memory apparatus and continued to be set until information enters the memory apparatus. Upon receipt of information by the memory apparatus, the sending of the dummy codes is interrupted and the received information is transmitted. This corresponds to a decreased transmission rate of information when the transmission is considered from the standpoint of sending forth true information without dummy codes as in the previous system because the dummy codes are not R. L. codes. This also means that the line 12 indicating the output transmission rate is made to approach the line segment 16 indicating the output generation rate. In this manner, the memory apparatus should store only the excess portion of the quantity of coded information when the output is generated at a higher rate than the instantaneous rate of transmission as indicated by the line 12, that could not be offset by the transmission, while transmitting all the information when the rate of the output generation has a more gradual slope than the slope of the line 12 for the transmission rate at a rate substantially equal to the rate of the output generation indicated by curve 13. In other words, the line 13 applies to a case where information is generated at a rate less than the transmission rate line 12. In such a case, the transmission rate can be equivalently reduced to keep pace with the line 13 by transmitting dummy codes. When information is generated at a rate higher than the rate of line 12, that is, when information is generated at too high a rate to be transmitted in time, the excess information has to be stored in a memory. In such a case, it can be buffered with a memory of small capacity over a short period of time. For the portion indicated by line segment 17 having a slope steeper than the slope of the line 12, the transmission is made at a rate equal to the slope of the line 12 without sending forth dummy codes. In this case, the required capacity of the memory apparatus is indicated at 18. As is apparent, in this system there is no need to adjust the starting time for the transmission in accordance with the original unlike the previous system where the transmission rate is constant; also the required capacity of the memory operation is reduced by a relatively large amount. When the ratio of compression of the transmitted picture (total number of picture information bits before coding divided by the total number of picture information bits after coding) is small and the rate of the information output generation is higher than the transmission rate, as is represented by lines 13 and 14, the advantage of reducing the memory capacity is small, since the rate of generation of information is high. By way of comparison, when the compression ratio is large, as is represented by a broken line 15 and the line 13 for the system of a constant transmission rate and by a dashed line 19 and the line 13 for the instant system, with the required memory capacity of the memory apparatus shown at 20 for the former and at 18 for the instant system, the memory capacity for the instant system may be reduced to one several tenths to one several hundredths of that of the capacity required for the constant transmission rates system.

It is to be noted that the maximum transmission rate depends upon the characteristics of the transmission line, so that when the capacity of the memory apparatus is determined the kinds of pictures that can be transmitted within the determined capacity are restricted accordingly.

Figure 7:
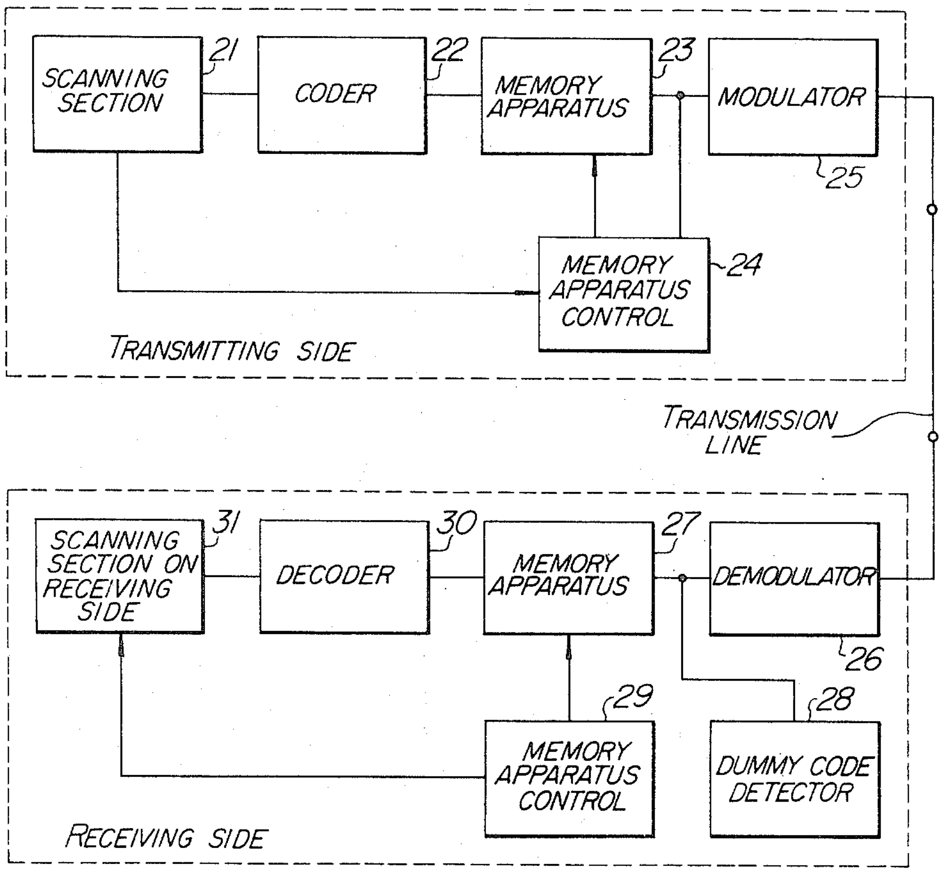
FIG. 7 is a block diagram of a facsimile apparatus made in accordance with the invention.

An example of the facsimile system adopting the code conversion system just described is not given with reference to FIG. 7. Scanning section 21 of the facsimile apparatus produces signals corresponding to the black and white picture elements. The signal output is fed to a coder 22, which feeds the coded signal to a memory apparatus 23. The memory apparatus 23 is inspected by a memory apparatus control 24, which generates dummy codes when there is no information in the memory apparatus 23. The dummy codes are fed to a modulator 25.

On the receiving side, the demodulated signal from a demodulator 26 is fed to a memory apparatus 27. If the demodulated signal corresponds to a dummy code, it is detected by a dummy code detector 28 and prevented from entering the memory apparatus 27. When a predetermined quantity of information is stored in the memory apparatus 27, a memory apparatus control 29 is actuated to feed the stored information to a decoder 30. The decoded signal is a replica of the original signal corresponding to a black or white picture element, and actuates a scanning section 31 on the receiving side to reproduce the received facsimile picture.

What is claimed is:

1. A method of compressing the bandwidth in facsimile transmission, comprising the steps of:

converting the lengths of each black and white level portion of a binary signal into respective binary codes of 0 and 1 digits having predetermined code lengths, dividing the coded signal into a plurality of blocks of equal length, and adding a bit distinguishing between the white level and black level portions of the binary signal to the block in which digit 1 first appears successively from the most significant digit, and to the following blocks of that particular level, while omitting all the blocks preceeding the block of that level containing said first appearing digit 1, thereby reducing the required code length.

2. A method according to claim 1, wherein the coded facsimile signal is temporarily stored in a memory before said coded signal is subjected to the steps of dividing, adding and omitting.

3. A method according to claim 1, wherein the coded facsimile signal is temporarily stored in a memory prior to the steps of dividing, adding and omitting, and the quantity of information stored in said memory is monitored at all times, whereby the codes that are different from the codes carrying information are sent forth when there is no information in said memory in order that the rate of transmission of the information may be varied correspondingly within the maximum allowable rate determined by the characteristics of the transmission line to reduce the required capacity of said memory.

4. An apparatus for compressing the bandwidth in a facsimile transmission system employing binary coded data signals representing the black and white levels of a video signal comprising:

first means, responsive to said binary-coded data signal, for converting the lengths of the black and white level portions thereof into binary codes of 0 and 1 digits having predetermined code lengths;

second means, responsive to said first means, for dividing the coded signal into a plurality of blocks of equal length;

third means, responsive to said first means and said second means, for generating for each of said blocks an additional bit, which represents one of said white and black level portions of the binary data signal;

fourth means, responsive to said second and third means, for adding said respective additional bit to the block, in which digit 1 first appears successively from the most significant digit, and to the following blocks of that particular level; and fifth means, responsive to said first means, for omitting all blocks preceeding the block of that level containing said first appearing digit 1, thereby reducing the required code length.

5. An apparatus according to claim 4, wherein said first means comprises a source of clock pulses, means, responsive to said source of clock pulses, for counting said clock pulses, and means, responsive to said data signal, for controlling the counting of said clock pulses by said counting means.

6. An apparatus according to claim 5, wherein said controlling means comprises a timing means, receiving said data signals, for generating timing pulses at the rise and fall times of said data signal, a first delay circuit, responsive to said timing pulse generator means, for providing a first read-out pulse and a second delay circuit, responsive to said first read-out pulse generated by said first delay circuit, for generating a second read-out pulse and supplying said second readout pulse to said counting means.

7. An apparatus according to claim 6, wherein said counting means comprises a plurality of counting circuits, connected in cascaded groups, each of which receives said second read-out pulse and the first of which is connected directly to said source of clock pulses.

8. An apparatus according to claim 7, wherein said second means comprises a plurality of first gate circuits, corresponding to said plurality of blocks and a cascaded group of counting circuits associated therewith, wherein each first gate circuit has an input thereof connected to the output of each counting circuit in its corresponding group and wherein the output of each first gate circuit is connected to an input of first registers associated with an adjacent group of counting circuits.

9. An apparatus according to claim 8, wherein said thrid means comprises a plurality of second gate circuits, corresponding to said plurality of blocks, one input of each of which is respectively connected to receive said binary data signal, a second input of each of which is connected to the outputs of the counters corresponding to that block, and another input of each of which is connected to the output of said first delay circuit.

10. An apparatus according to claim 9, wherein said fifth means includes a plurality of third gate circuits, each of which is associated with a respective group of counting circuits and is responsive to the outputs of each counting circuit in its associated group and has one of its outputs connected to the first gate circuit of that respective group.

11. An apparatus according to claim 10, further wherein said fourth means includes of said second gate circuits.

12. An apparatus according to Claim 11, wherein said third gate circuits are "OR" gates and said first and second gate circuits are "AND" gates.

13. An apparatus according to claim 4, further including a memory apparatus connected to temporarily store a facsimile coded signal, a memory control apparatus connected thereto for generating dummy codes in said memory when no information exists in said memory and a modulator for modulating the output of said memory.

14. An apparatus according to claim 13, further including a receiver for demodulating and decoding the output of said modulator comprising a demodulator for demodulating the signal produced by said modulator, a receiver memory apparatus connected thereto, a dummy code detector connected to said demodulator and said receiver memory apparatus for preventing the dummy code from entering said receiver memory, a decoder connected to the output of said receiver memory apparatus and a replica scanning section for producing said decoded signal.

15. An apparatus according to claim 12, further including a memory apparatus connected to temporarily store a facsimile coded signal, a memory control apparatus connected thereto for generating dummy codes in said memory when no information exists in said memory and a modulator for modulating the output of said memory.

16. An apparatus according to claim 15, further including a receiver for demodulating the decoding the output of said modulator comprising a demodulator for demodulating the signal produced by said modulator, a receiver memory apparatus connected thereto, a dummy code detector connected to said demodulator and said receiver memory apparatus for preventing the dummy code from entering said receiver memory, a decoder connected to the output of said receiver memory apparatus and a replica scanning section for reproducing said decoded signal.

* * * * *